(12) United States Patent
Brookins (10) Patent No.: US 10,738,908 B1
(45) Date of Patent: Aug. 11, 2020

(54) ROTATIONAL MAGNET INDEXING VALVE

(71) Applicant: Keith Donald Brookins, Miami, FL (US)

(72) Inventor: Keith Donald Brookins, Miami, FL (US)

( * ) Notice: Subject to any disclaimer, the term of this patent is extended or adjusted under 35 U.S.C. 154(b) by 37 days.

(21) Appl. No.: 16/273,537

(22) Filed: Feb. 12, 2019

(51) Int. Cl.
*F16K 11/22* (2006.01)
*F16K 31/06* (2006.01)
*F16K 31/04* (2006.01)

(52) U.S. Cl.
CPC .......... *F16K 31/0613* (2013.01); *F16K 11/22* (2013.01); *F16K 31/047* (2013.01)

(58) Field of Classification Search
USPC .......................................... 137/876
See application file for complete search history.

(56) References Cited

U.S. PATENT DOCUMENTS

| | | |
|---|---|---|
| 3,119,170 A | 1/1964 | Buck |
| 5,284,299 A | 2/1994 | Medlock |
| 5,699,781 A | 12/1997 | Johnson |
| 5,934,885 A | 8/1999 | Farrell et al. |
| RE36,378 E | 11/1999 | Mellette |
| 6,267,352 B1 * | 7/2001 | Semeyn, Jr. .............. F02D 9/02 123/339.15 |
| 7,284,571 B2 * | 10/2007 | Ozawa .................. F16K 31/042 137/625.46 |
| 7,296,760 B2 | 11/2007 | Alexander et al. |
| 7,922,152 B2 * | 4/2011 | Hara ..................... F16K 11/165 137/607 |
| 2012/0006436 A1 * | 1/2012 | Morimoto ............. F25B 41/003 137/625 |
| 2013/0059256 A1 * | 3/2013 | Cadeau ..................... F23N 1/00 431/280 |
| 2014/0263690 A1 | 9/2014 | Eckman |

FOREIGN PATENT DOCUMENTS

WO   2006054221 A1   5/2006

* cited by examiner

*Primary Examiner* — John Fox
(74) *Attorney, Agent, or Firm* — Albert Bordas, P.A.

(57) ABSTRACT

A rotational magnet indexing valve, which has a housing assembly and a rotational magnet valve assembly. The rotational magnet valve assembly has a driven gear assembly, a manifold assembly, a motor assembly, and a plurality of magnetic cartridge valve assemblies. The rotational magnet valve assembly has an inlet and a plurality of outlets. The manifold assembly is cylindrical in shape. The plurality of magnetic cartridge valve assemblies is radially positioned on the manifold assembly. The motor assembly is joined to the manifold assembly by a bridge.

18 Claims, 13 Drawing Sheets

ROTATIONAL MAGNET INDEXING VALVE

BACKGROUND OF THE INVENTION

1. Field of the Invention

The present invention relates to indexing valves, and more particularly, to rotational magnet indexing valves.

2. Description of the Related Art

Applicant believes that one of the closest references corresponds to U.S. Patent Application Publication No. 2014/0263690, published on Sep. 18, 2014 to Ron Eckman for Large area liquid solution application. However, it differs from the present invention because Eckman teaches a large area liquid solution application having a boom equipped with a series of removable spray nozzles attached to a standard truck trailer hitch receiver with a pump assembly attached onto a reservoir loaded onto a truck bed. A deicing apparatus sprays brine evenly on the pavement. The reservoir is secured manually with standard ratchet straps and the boom connects to any standard truck tow hitch without the use of tools. The equipment panel with attached pump is removable and the pump fittings and corresponding output hoses manually snap in and out of place to allow maintenance and cleaning. Communicating wirelessly, it is activated by a wireless key enabling a truck driver to control the system without needing to exit the vehicle and manually shut the sprayer.

Applicant believes that another reference corresponds to U.S. Pat. No. 7,296,760 issued to Alexander, et al. on Nov. 20, 2007 for Indexing valve. However, it differs from the present invention because Alexander, et al. teach a valve for controlling the flow of a gas or mixture of gases through a passageway in a coating material dispensing device that includes first and second valve portions. The first valve portion is adjustable with respect to the second valve portion selectively to adjust the flow through the passageway. One of the first and second valve portions has a first engagement member and the other of the first and second valve portions has a second engagement member. Engagement of the first and second engagement members indicates the relative orientation of the first and second valve portions.

Applicant believes that another reference corresponds to U.S. Pat. No. 5,934,885 issued to Farrell, et al. on Aug. 10, 1999 for Reagent pump assembly. However, it differs from the present invention because Farrell, et al. teach a reagent pump assembly for metering precise volumes of fluids, such as reagent, for an analytical instrument, such as a clinical hematology or flow cytometer instrument. The assembly has a multilayer block having a plurality of diaphragm pumps interposed between two of the layers, controlled by application of one of vacuum or pressure, in sequence, to fill the reservoirs and expel the contents of the pump. One-way check valves are used to control the fluid flow from the reservoirs of fluids to the fluid outlet ports. The fluid outlet ports may be directly coupled to fluid inlet ports of a compatible unified flow circuit, which contains reaction chambers and a plurality of sample aliquots. The reagent pump assembly can be used to combine and mix a sample aliquots with a precise amount of reagent in a reaction chamber, preparatory for analyzing the reaction mixture.

Applicant believes that another reference corresponds to U.S. Pat. No. 5,699,781 issued to Johnson, et al. on Dec. 23, 1997 for Rapid fire compressed air gun. However, it differs from the present invention because Johnson, et al. teach an air compressed gun having a stock, a barrel, a trigger, and a manual air pump. The gun also has a magazine having a series of barrels for holding several projectiles. An actuator indexes the magazine with each shot of the gun and automatically controls bursts of pressurized air. The actuator has a manifold having an inlet opening, an outlet opening and a firing opening, and a piston mounted within the manifold, which directs the flow of air therethrough for sequential firing.

Applicant believes that another reference corresponds to U.S. Pat. No. 5,284,299 issued to William D. Medlock on Feb. 8, 1994 for Pressure compensated HVLP spray gun. However, it differs from the present invention because Medlock teaches a HVLP spray gun capable of operating from a source of high-pressure air. Compressed air is delivered to the gun through a relatively small diameter air hose. A pressure compensated control valve is mounted in the spray gun to reduce the air pressure delivered to an air/fluid nozzle to a predetermined pressure. The control valve maintains a constant air pressure at the nozzle.

Applicant believes that another reference corresponds to U.S. Pat. No. 3,119,170 issued to William H. Buck, on Jan. 28, 1964 for Turret indexing control device. However, it differs from the present invention because Buck teaches a turret-controlling device for a machine tool and a hydraulic feeding apparatus wherein the relative approach of the work and the tool proceeds at various selected speeds corresponding in a predetermined manner with various positions of a turret.

Applicant believes that another reference corresponds to U.S. Pat. No. RE36378 issued to Robert R. Mellette, on Nov. 9, 1999 for High volume low pressure air spray gun. However, it differs from the present invention because Mellette teaches a high volume low pressure air spray gun having an atomizing air orifice for atomizing a stream of liquid coating material into a conical spray and opposed side port air orifices for flattening the spray into a fan-shaped pattern. The gun receives air at pressures up to about 100 psi, and an air flow restriction in the form of a venturi is in an air supply passage in the gun barrel. A valve stem for controlling the flow rate of air to the side port orifices extends through the venturi, and is configured to vary the venturi air flow area in response to changes in the flow rate of air to the side port orifices. When the valve stem is positioned for maximum air flow to the side port orifices, it establishes a maximum air flow area through the venturi, such that a high pressure of air at the gun air inlet, after flowing through the venturi, results in a high volume low pressure air flow at the atomizing and side port orifices. When the valve stem is positioned to reduce airflow to the side port orifices, it correspondingly reduces the flow area through the venturi to maintain the pressure of air at the atomizing orifice below a selected maximum value. The gun may carry a paint cup, in which case the cup is pressurized by air downstream from the venturi to prevent over pressurization of the cup.

Applicant believes that one of the closest references corresponds to WIPO Publication No. 2006/054221, published on May 26, 2006 to Kevin L. Alexander for Indexing valve. However, it differs from the present invention because Alexander teaches a valve for controlling the flow of a gas or mixture of gases through a passageway in a coating material dispensing device includes first and second valve portions. The first valve portion is adjustable with respect to the second valve portion selectively to adjust the flow through the passageway. One of the first and second valve portions has a first engagement member and the other of the first and second valve portions includes a second engagement member. Engagement of the first and second engagement members indicates the relative orientation of the first and second valve portions.

Other patents describing the closest subject matter provide for a number of more or less complicated features that fail to solve the problem in an efficient and economical way. None of these patents suggest the novel features of the present invention.

SUMMARY OF THE INVENTION

The present invention is a rotational magnet indexing valve, comprising a housing assembly and a rotational magnet valve assembly. The rotational magnet valve assembly comprises a driven gear assembly, a manifold assembly, a motor assembly, and a plurality of magnetic cartridge valve assemblies.

The housing assembly comprises an upper housing, a lower housing, an inlet tube hole, a connector, and a plurality of outlet tube holes. The rotational magnet valve assembly further comprises an inlet and a plurality of outlets.

The driven gear assembly comprises a driven gear, a yoke with a top base and a top base hole, a bearing, and an inlet cap having an inlet cap top protrusion and an inlet cap hole.

The driven gear mounts onto the yoke, the yoke receives the bearing and the inlet cap that are mounted together onto the manifold assembly. The top base hole receives the inlet cap top protrusion and the inlet cap hole receives the inlet tube. The yoke comprises a yoke magnet tab having a channel with a magnet hole and a magnet.

The manifold assembly comprises a top face, a bottom face, a lateral side, a bridge, a manifold inlet hole, and a sensor hole. The lateral side comprises a plurality of cartridge bores. Each of the cartridge bores extends until connecting to respective manifold interior holes. The manifold assembly further comprises a pressure sensor, tube fitting connectors, and a plurality of outlet tubes.

The motor assembly comprises a motor housing having a housing top face, a housing bottom face, a motor shaft thru hole, a drive gear, and a motor. Each of the magnetic cartridge valve assembly comprises a cartridge body, a cartridge head, a circumferential fluid recess, a fluid passage hole, and a cartridge cavity.

The cartridge cavity receives a cartridge magnet, a piston push rod, a piston, a return spring, and a retaining washer. The housing assembly houses the rotational magnet valve assembly, a controller, and a power supply. The manifold assembly is cylindrical in shape.

The plurality of magnetic cartridge valve assemblies is radially positioned on the manifold assembly, whereby each cartridge bore receives a respective magnetic cartridge valve assembly.

The motor assembly is joined to the manifold assembly by the bridge, whereby the motor assembly is substantially parallel to a central axis of rotation of the rotational magnet valve assembly. The motor housing is separated a first predetermined distance from the lateral side, and the yoke extends a second predetermined distance from the lateral side, wherein the first predetermined distance is greater than the second predetermined distance.

The motor provides a substantial power to the drive gear to move the driven gear, whereby the magnet orbits around the lateral side. When the magnet approaches each cartridge magnet, a magnetic force causes each return spring and piston to move, thus opening a fluid flow passage.

It is therefore one of the main objects of the present invention to provide a rotational magnet indexing valve.

It is another object of this invention to provide a rotational magnet indexing valve comprising a single inlet and multiple outlets.

It is another object of this invention to provide a rotational magnet indexing valve that works due to a magnetic field created by a set of magnets.

It is another object of this invention to provide a rotational magnet indexing valve that is volumetrically efficient for carrying, transporting, and storage.

It is another object of this invention to provide a rotational magnet indexing valve, which is of a durable and reliable construction.

It is yet another object of this invention to provide a rotational magnet indexing valve that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is a rotational magnet indexing valve, and is generally referred to with numeral 10. It can be observed that it basically includes housing assembly 20 and rotational magnet valve assembly 40 comprising driven gear assembly 50, manifold assembly 120, motor assembly 160, and a plurality of magnetic cartridge valve assemblies 200.

Figure 1:
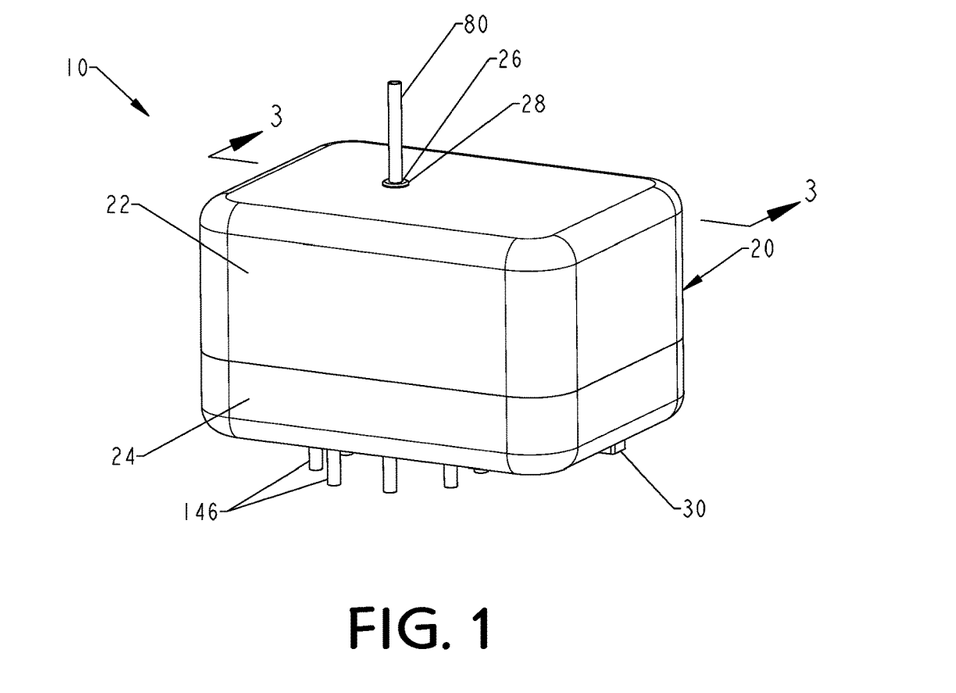
FIG. 1 is a front isometric view of the present invention.
Figure 2:
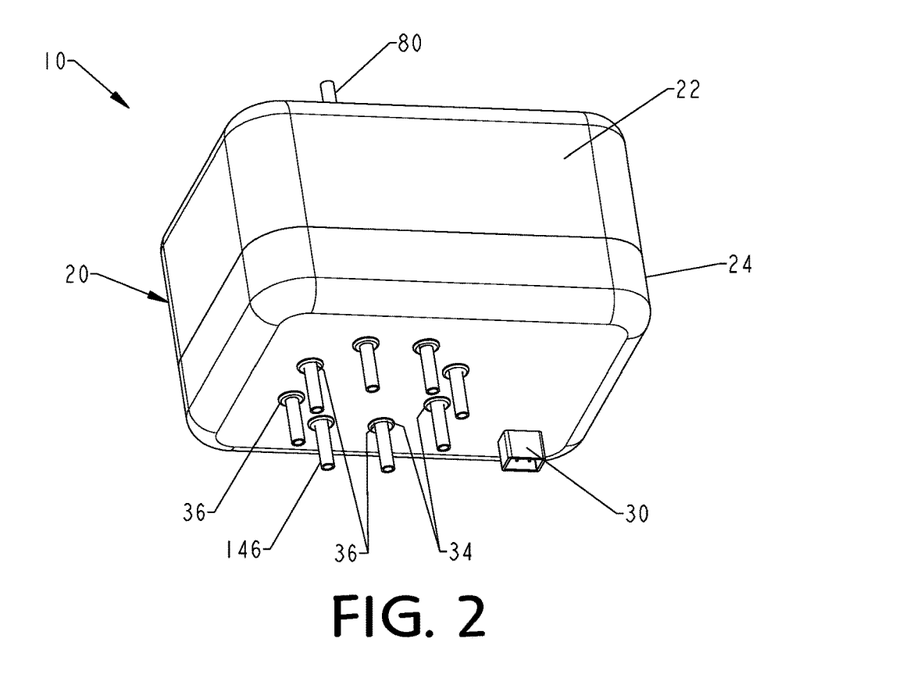
FIG. 2 is a bottom isometric view of the present invention.

As seen in FIGS. 1 and 2, housing assembly 20 comprises upper housing 22, lower housing 24, inlet tube hole 26, connector 30, and a plurality of outlet tube holes 34.

Housing assembly 20 further comprises sealing grommet 28 and outlet tube grommets 36. Sealing grommet 28 is positioned on inlet tube hole 26 and outlet tube grommets 36 are positioned onto outlet tube holes 34. In a preferred embodiment, housing assembly 20 is cuboid in shape.

Figure 3:
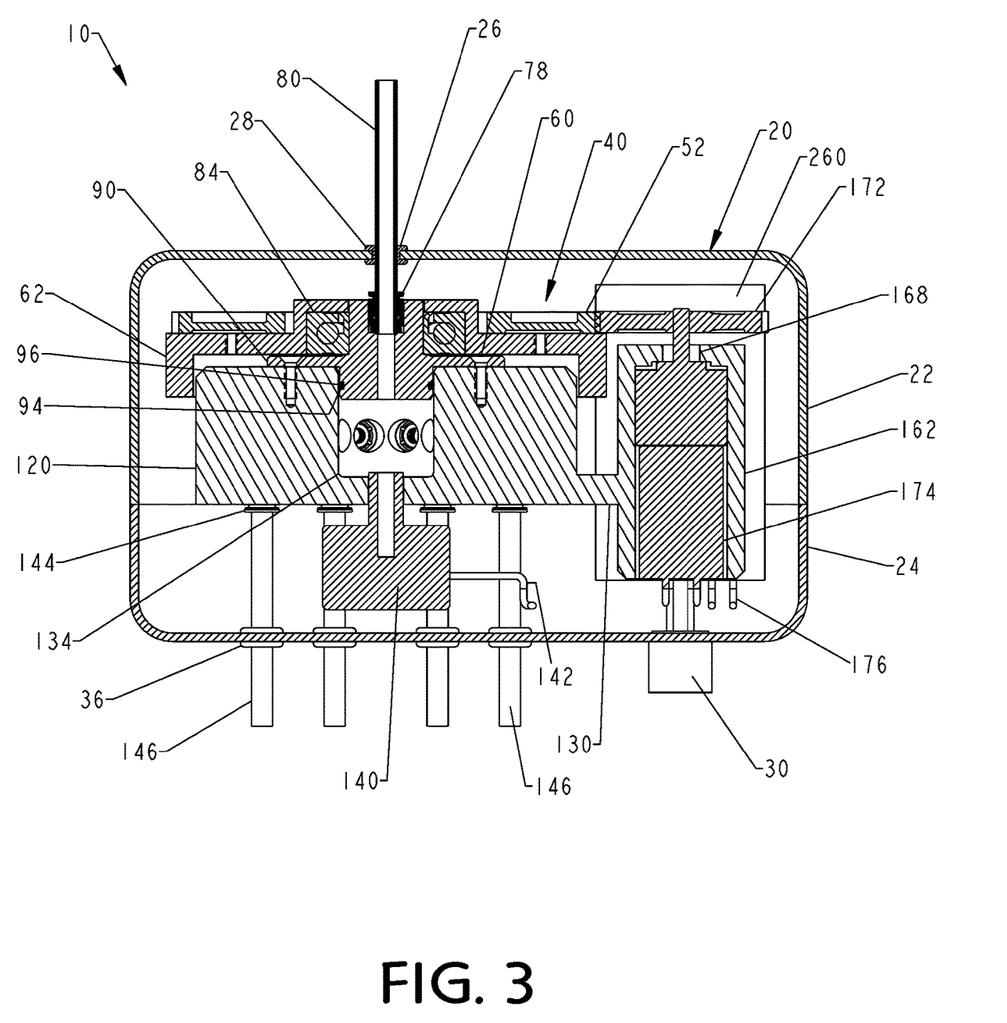
FIG. 3 is a cut view taken along the lines 3-3 as seen in FIG. 1.
Figure 17:
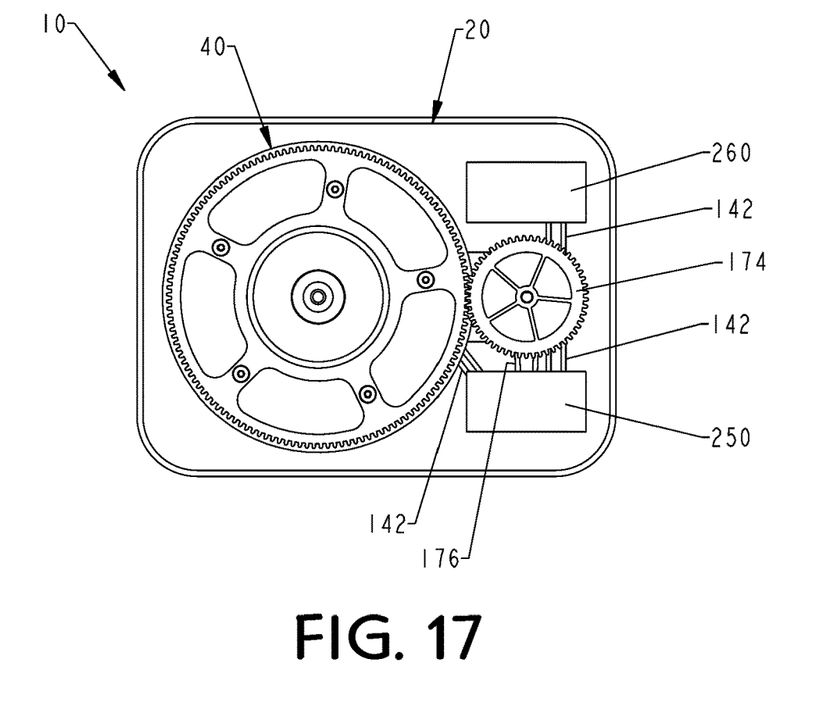
FIG. 17 is a cut view taken along the lines 17-17 as seen in FIG. 16 showing a controller and a power supply.

As seen in FIG. 3, housing assembly 20 houses rotational magnet valve assembly 40. Inlet tube 80 extends from inlet tube hole 26 and outlet tubes 146 extend from outlet tube holes 34. Pressure sensor 140 has pressure sensor wires 142 and motor 174 has motor wires 176. Housing assembly 20 further houses controller 250, as seen in FIG. 17, and power supply 260.

Figure 4:
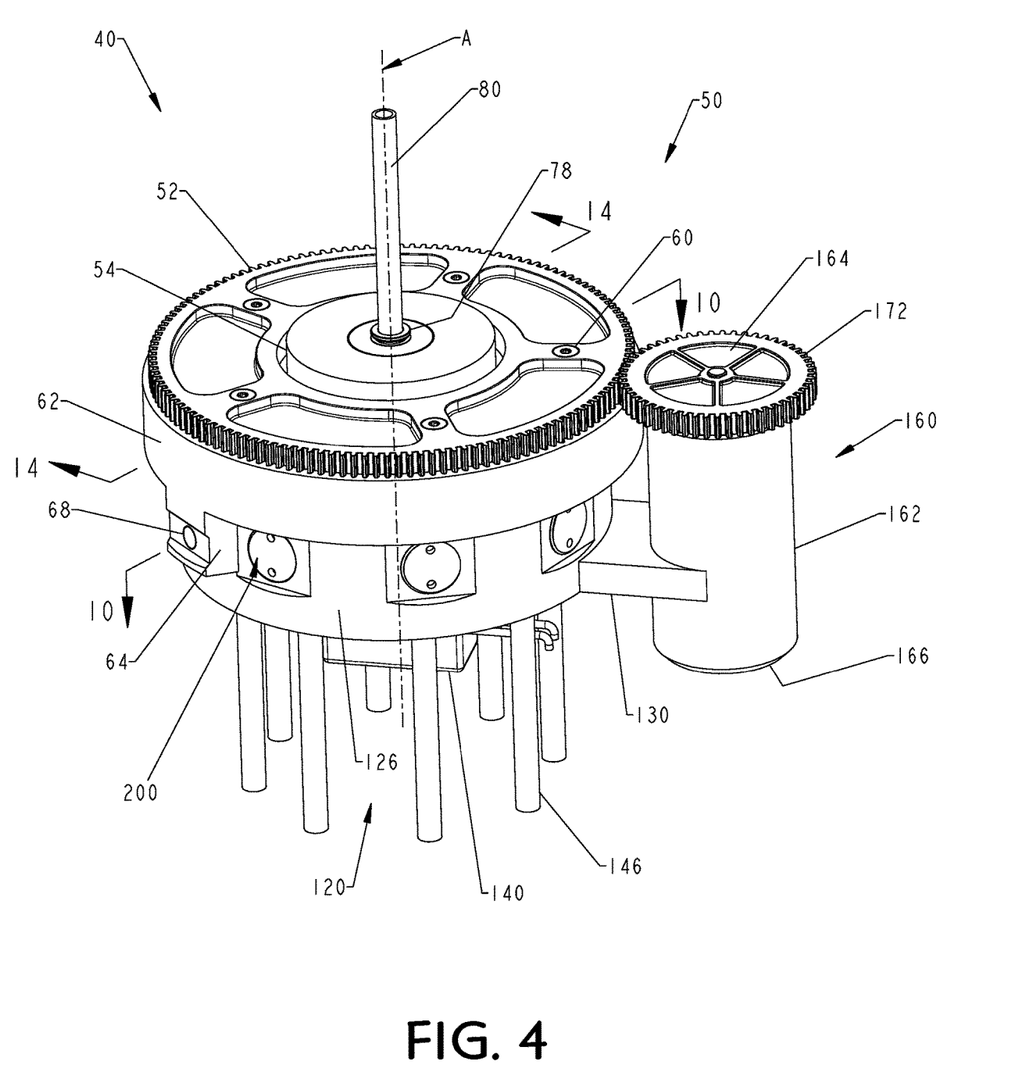
FIG. 4 is a front isometric view of a rotational magnet valve assembly of the present invention representing a closed configuration.
Figure 5:
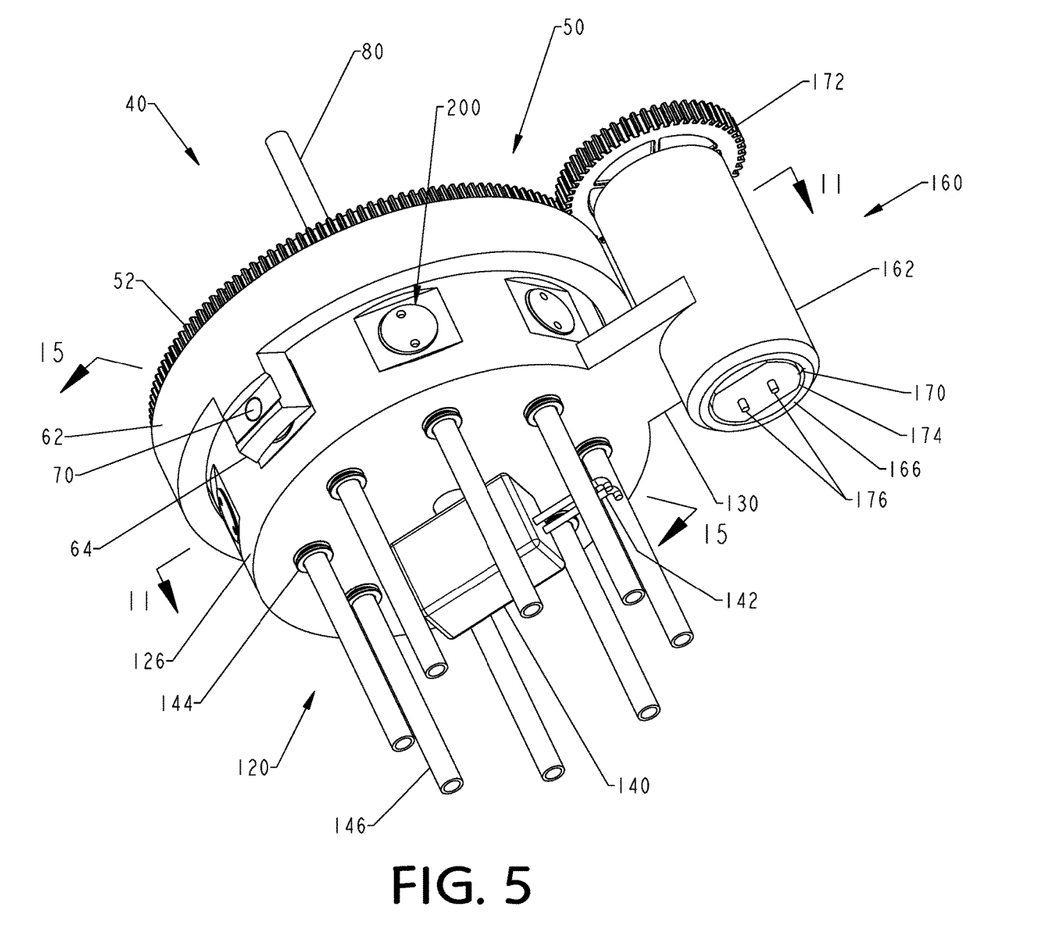
FIG. 5 is a bottom isometric view of the rotational magnet valve assembly of the present invention representing an opened configuration.

As seen in FIGS. 4 and 5, rotational magnet valve assembly 40 comprises driven gear assembly 50, manifold assembly 120, motor assembly 160, and a plurality of magnetic cartridge valve assemblies 200. Driven gear assembly 50 is mounted onto manifold assembly 120, and motor assembly 160 is joined to manifold assembly 120. Rotational magnet valve assembly 40 is an expandable electro-mechanical pressure-triggered valve.

Motor assembly 160 is joined to manifold assembly 120 by bridge 130, whereby motor assembly 160 is substantially parallel to a central axis of rotation A, seen in FIG. 4, of rotational magnet valve assembly 40. Motor housing 162 is separated a first predetermined distance from lateral side 126, and yoke 62 extends a second predetermined distance from lateral side 126. The first predetermined distance is greater than the second predetermined distance in order for yoke magnet tab 64 to rotate around lateral side 126. In addition, the first predetermined distance provides that teeth of driven gear 52 and drive gear 172 engage. When motor 174 turns on, a gear train consisting of drive gear 172 and driven gear 52 cause magnet 70 to orbit around lateral side 126 and central axis of rotation A, seen in FIG. 4, of rotational magnet valve assembly 40.

Magnetic cartridge valve assemblies 200 are mounted into manifold assembly 120. Manifold assembly 120 is cylindrical in shape and comprises pressure sensor 140, tube fitting connectors 144, and a plurality of outlet tubes 146. Magnetic cartridge valve assembly 200 is spring biased in a normally close configuration and only opens with electromagnetic, or electro-mechanical intervention to prevent the unwanted release of fluid from magnetic cartridge valve assembly 200.

Figure 6:
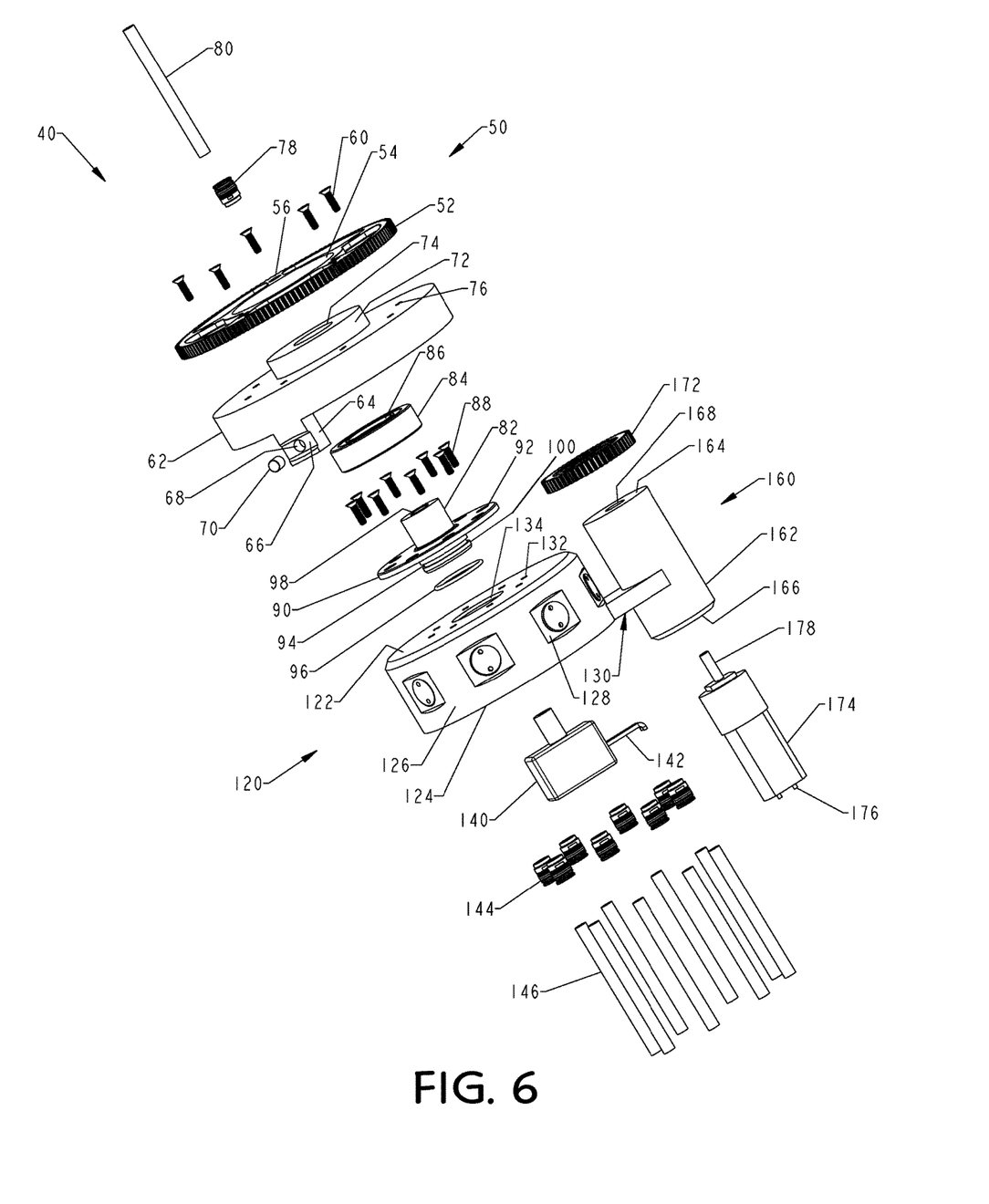
FIG. 6 is an exploded view of the rotational magnet valve assembly of the present invention.

As seen in FIG. 6, driven gear assembly 50 comprises driven gear 52, yoke 62, inlet tube 80, bearing 84, and inlet cap 90.

Driven gear 52 comprises driven gear hole 54 and screw thru holes 56 to receive gear mounting screws 60. Yoke 62 comprises yoke magnet tab 64, top base 72, and top base hole 74. Yoke magnet tab 64 comprises channel 66 having a magnet hole 68, wherein magnet 70 is positioned.

Driven gear 52 mounts onto yoke 62, whereby driven gear hole 54 receives top base 72, and gear mounting screws 60 pass through respective screw thru holes 56 to be fixed into respective yoke holes 76. Although not illustrated, it is noted that top base 72 may comprise a set screw threaded hole with set screw to secure bearing 84.

Inlet cap 90 comprises inlet cap top protrusion 82, inlet cap screws 88, screw thru holes 92, inlet cap hole 98, and inlet cap bottom base 100. Inlet cap bottom base 100 comprises o-ring groove 94 to receive o-ring seal 96. O-ring seal 96 in o-ring groove 94 prevents leakage of fluid between manifold assembly 120 and inlet cap 90.

Figure 8:
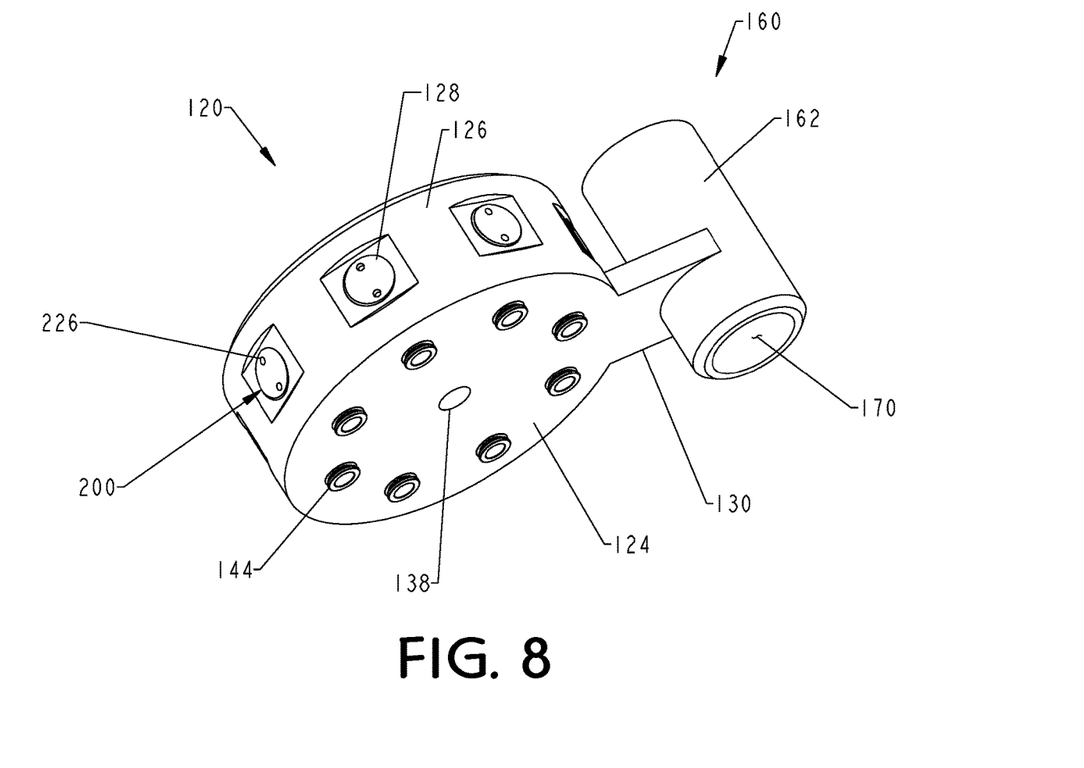
FIG. 8 is a bottom isometric view of the manifold assembly with magnetic cartridge valve assemblies inside, and the motor housing.

Motor assembly 160 comprises motor housing 162 having housing top face 164, and housing bottom face 166. Housing top face 164 has motor shaft thru hole 168. Housing bottom face 166 comprises bottom cavity 170, as seen in FIG. 8, to receive motor 174. Motor 174 comprises motor wires 176 and motor shaft 178. Motor shaft 178 extends from motor shaft thru hole 168 to receive drive gear 172. Motor 174 provides substantial power to drive gear 172 to move driven gear 52, and not only makes alignment but holds a mechanical alignment.

Figure 7:
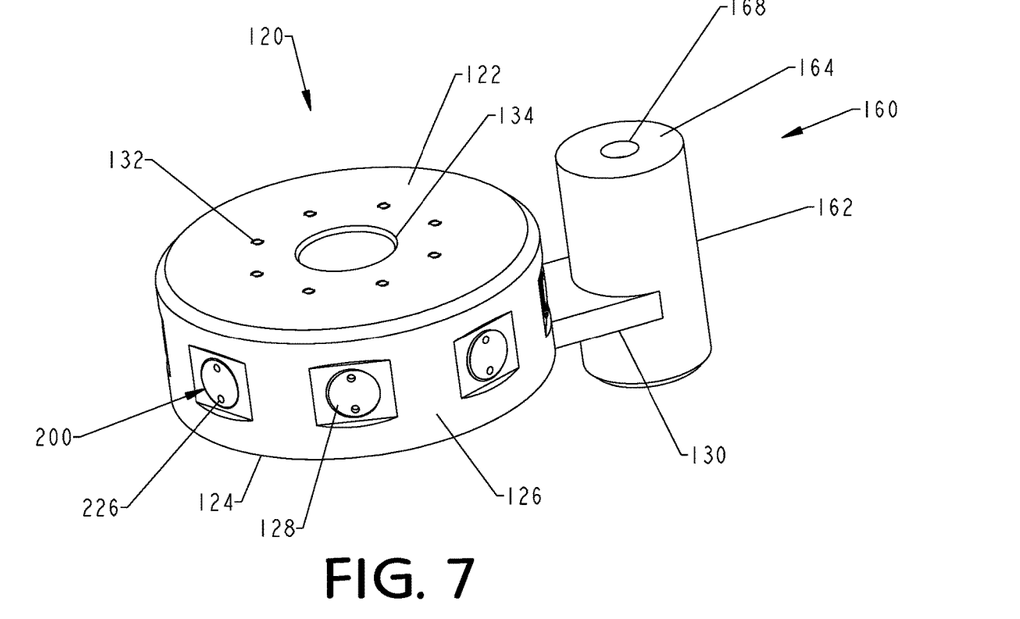
FIG. 7 is a top isometric view of a manifold assembly with magnetic cartridge valve assemblies inside, and a motor housing.

As seen in FIGS. 7 and 8, manifold assembly 120 comprises top face 122, bottom face 124, lateral side 126, bridge 130, manifold inlet hole 134, and sensor hole 138.

Lateral side 126 comprises a plurality of cartridge bores 128, wherein respective magnetic cartridge valve assembly 200 are positioned. Top face 122 comprises tapped holes 132 that are in a radial arrangement and equally spaced. Tapped holes 132 receive inlet cap screws 88 to secure inlet cap 90, both seen in FIG. 6, onto manifold assembly 120.

Figure 10:
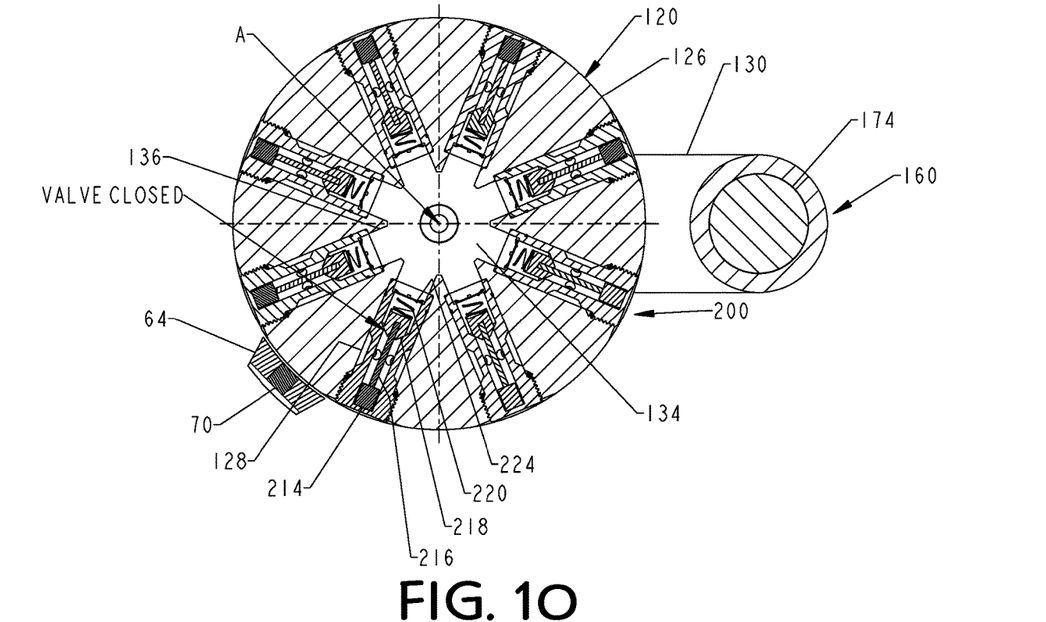
FIG. 10 is a cut view taken along the lines 10-10 as seen in FIG. 4, showing the closed configuration.

Manifold assembly 120 is made from a non-magnetic material so that it does not interfere with a magnetic field generated by magnet 70 and cartridge magnet 214, both seen in FIG. 10.

Figure 9:
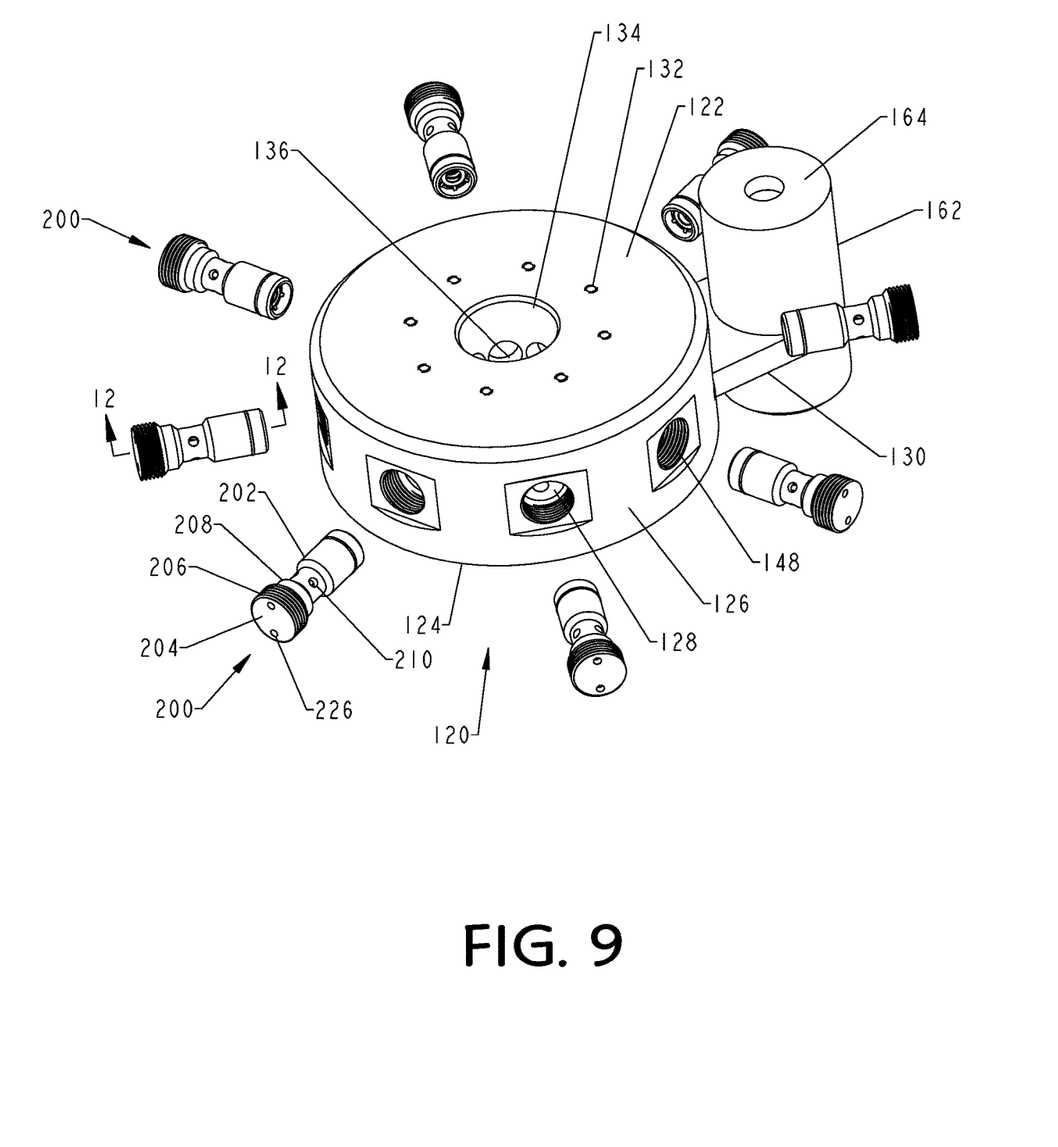
FIG. 9 is a top isometric view of the manifold assembly with magnetic cartridge valve assemblies outside, and the motor housing.

As seen in FIG. 9, magnetic cartridge valve assemblies 200 are radially positioned on manifold assembly 120, whereby each of cartridge bores 128 receives a respective magnetic cartridge valve assembly 200. Cartridge bores 128 are equally spaced orthogonally to central axis of rotation A, seen in FIG. 4.

In a preferred embodiment, each of cartridge bores 128 comprise bore threads 148 to secure each magnetic cartridge valve assembly 200 by cartridge threads 206. Cartridge threads 206 engage bore threads 148 and provide for robust attachment between manifold assembly 120 and magnetic cartridge assembly 200. Sealing between cartridge threads 206 and bore threads 148 can be accomplished using American National Standard Taper Pipe Thread (NPT), and/or thread locker, Teflon tape, or a variety of other sealing methods.

Figure 14:
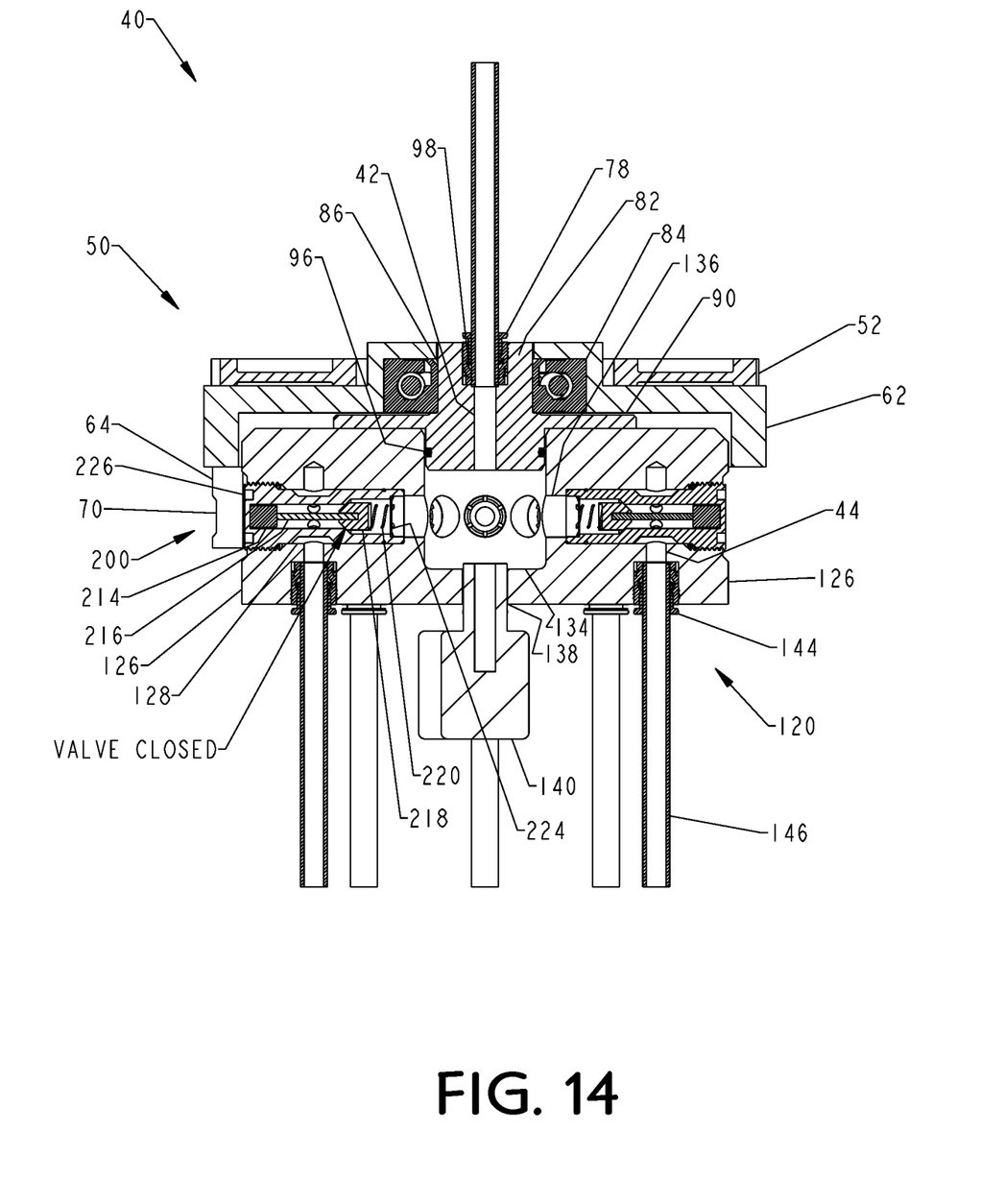
FIG. 14 is a cut view taken along the lines 14-14 as seen in FIG. 4, showing the magnetic cartridge valve assembly in closed configuration.

Each of cartridge bores 128 extends until connect with respective manifold interior holes 136. Manifold interior holes 136 provide communication of fluid between manifold inlet hole 134, multiple cartridge bores 128, and outlets 44, as seen in FIG. 14.

Figure 11:
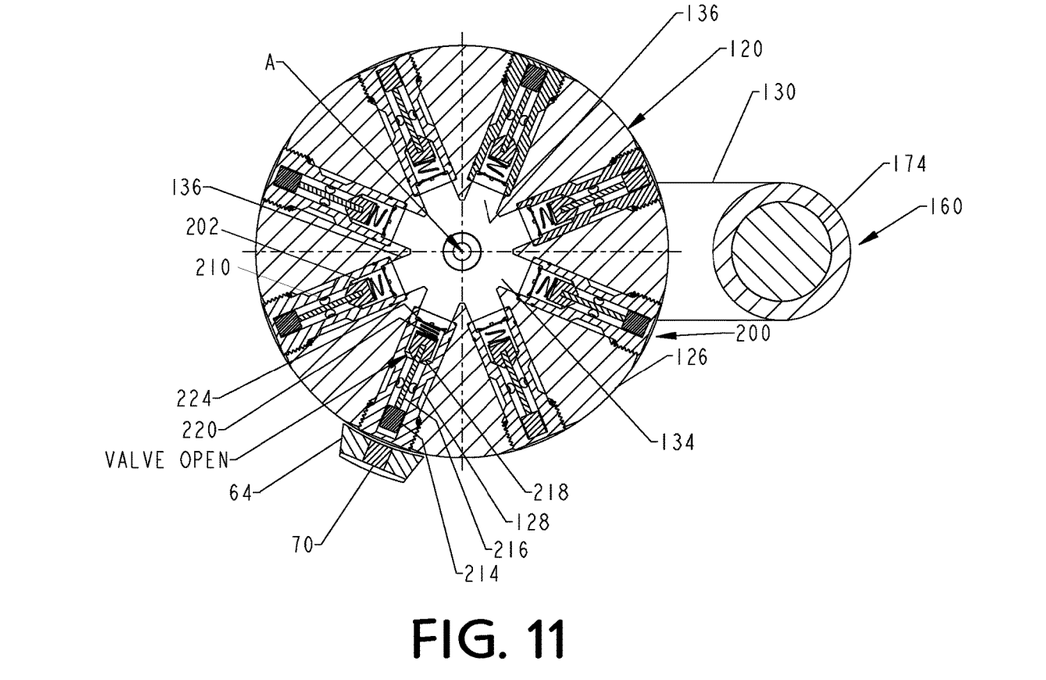
FIG. 11 is a cut view taken along the lines 11-11 as seen in FIG. 5, showing the opened configuration.

As seen in FIGS. 10 and 11, magnetic cartridge valve assemblies 200 radially mounted onto manifold assembly 120, may be in an opened or closed configuration, whereby each of magnetic cartridge valve assembly 200 may start or stop fluid flow.

In operation, magnet 70 orbits around lateral side 126. As an orbiting magnet 70 comes in close proximity to a respective magnetic cartridge valve assembly 200, each with its own internal cartridge magnet 214, a magnetic field is generated between magnet 70 and cartridge magnet 214. Magnet 70 and cartridge magnet 214 push against one another, thus pushing on return spring 220 with piston 218, opening a fluid path, and allowing pressurized fluid to flow. Return spring 220 causes piston 218 to close the flow path. When magnet 70 comes in close proximity to cartridge magnet 214, an opposing magnetic force between magnet 70 and cartridge magnet 214 overcomes a spring force from return spring 220 and opens the fluid flow path.

It is noted that small momentary power consumption re-selects fluid path, no notable pressure is lost through system, and no power is required to maintain open pathway.

Figure 12:
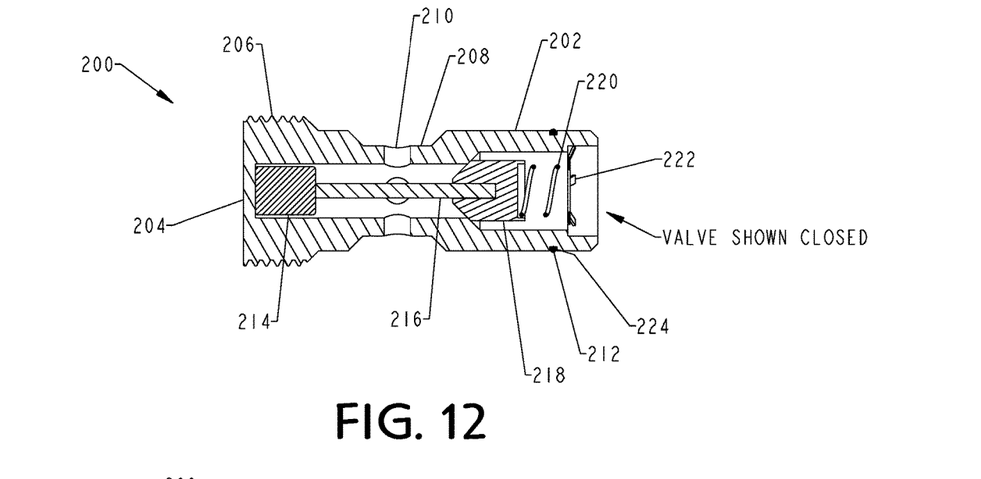
FIG. 12 is a cut view taken along the lines 12-12 on magnetic cartridge valve assembly, as seen in FIG. 9.
Figure 13:
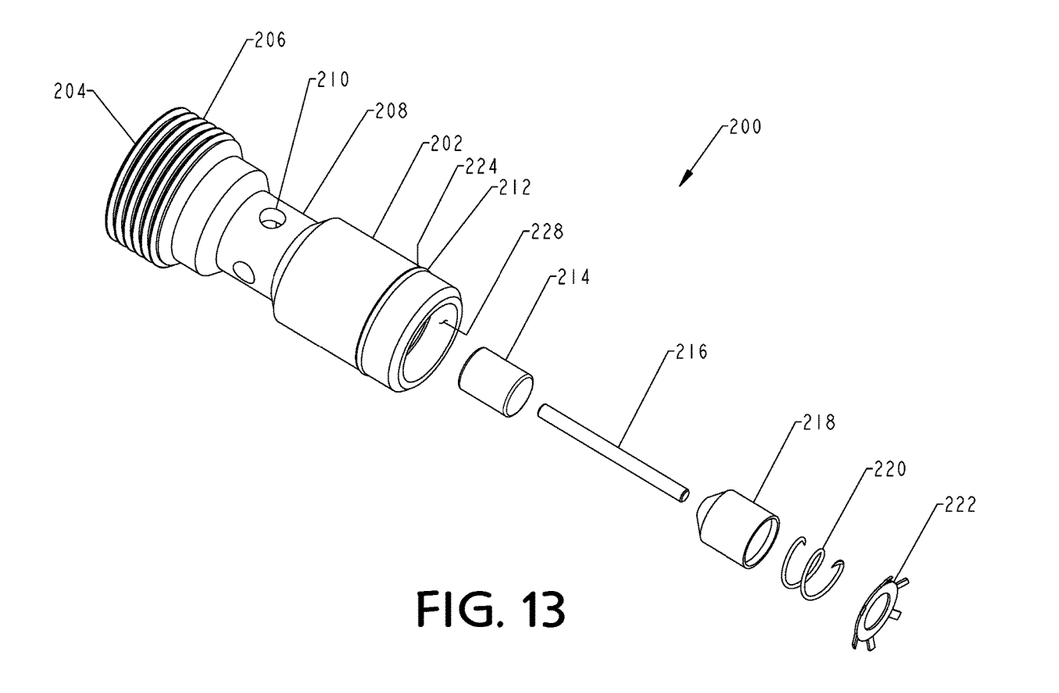
FIG. 13 is an exploded view of the magnetic cartridge valve assembly.

As seen in FIGS. 12 and 13, each magnetic cartridge valve assembly 200 comprises cartridge body 202, cartridge head 204, circumferential fluid recess 208 with fluid passage holes 210, and cartridge cavity 228. Cartridge head 204 comprises engagement feature 226, as seen in FIG. 9.

Cartridge cavity 228 receives cartridge magnet 214, piston push rod 216, piston 218, return spring 220, and retaining washer 222. Cartridge body 202 comprises o-ring groove 224 to receive o-ring 212.

Cartridge body 202 is made from a non-magnetic material so that it does not interfere with the magnetic field generated by magnet 70, seen in FIG. 5, nor cartridge magnet 214.

Figure 15:
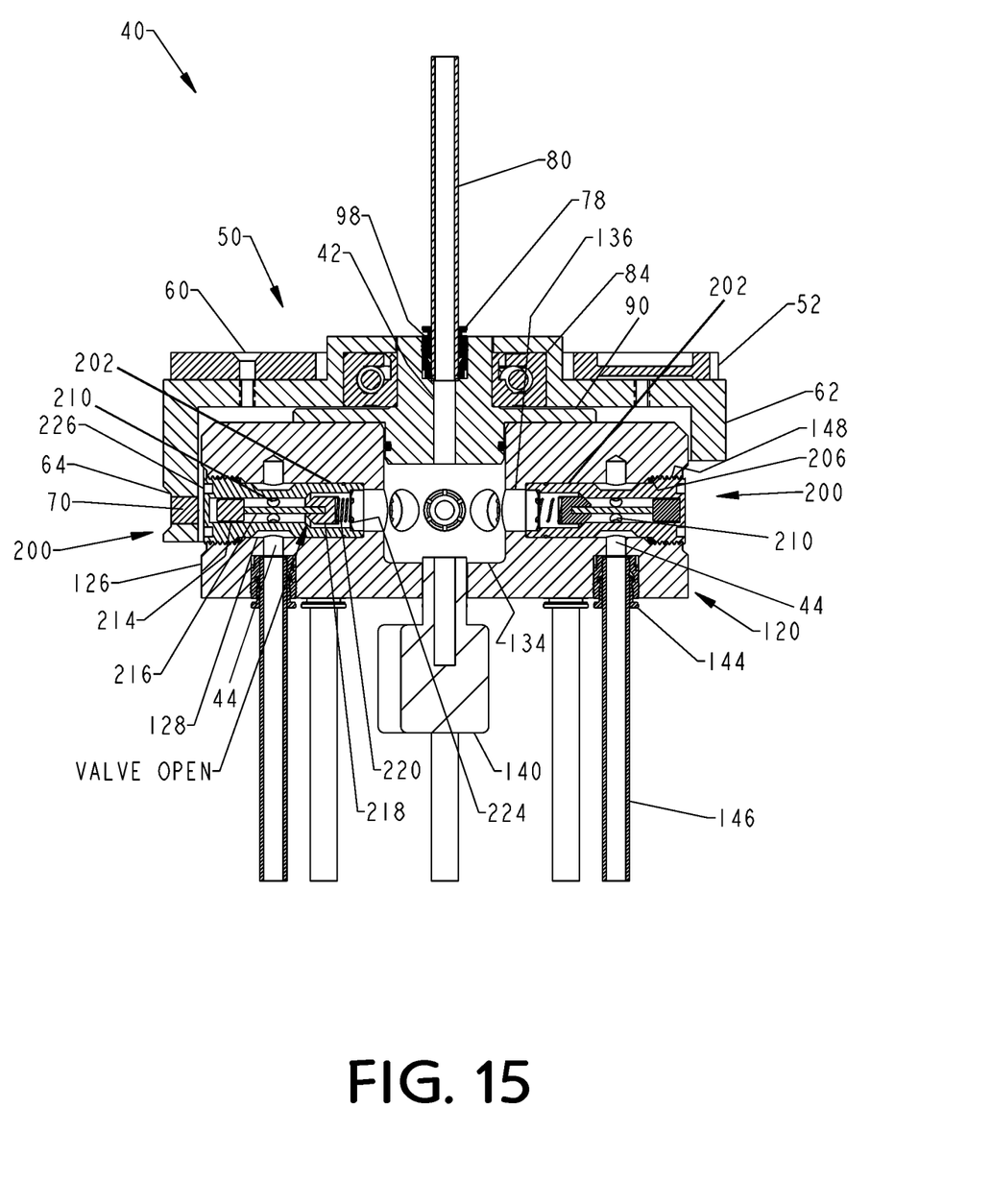
FIG. 15 is a cut view taken along the lines 15-15 as seen in FIG. 5, showing a magnetic cartridge valve assembly in the open configuration.

As seen in FIGS. 14 and 15, rotational magnet valve assembly 40 further comprises inlet 42 and a plurality of outlets 44. Inlet 42 is formed through central axis of rotation A, seen in FIG. 4, of inlet cap 90. Bearing 84 is mounted onto inlet cap 90. Yoke 62 receives bearing 84 and inlet cap 90 to be mounted together onto manifold assembly 120, whereby bearing 84 is between an interior face of yoke 62 and inlet cap 90.

Bearing 84 allows for yoke 62 to smoothly and efficiently rotate around inlet cap 90 and manifold assembly 120. In addition, bearing 84 allows inlet 42 to remain stationary. Bearing hole 86 receives inlet cap top protrusion 82 and tube fitting connector 78 is poisoned on inlet cap hole 98 to receive inlet tube 80. Sensor hole 138 receives pressure sensor 140.

Rotational magnet valve assembly 40 comprises a single inlet 42 and multiple outlets 44 used to dispense fluid from a single or centralized fluid supply location to multiple other locations. In an open configuration, as seen in FIG. 15, fluid flows through cartridge body 202, exits through fluid passage holes 210, and then through outlets 44.

Figure 16:
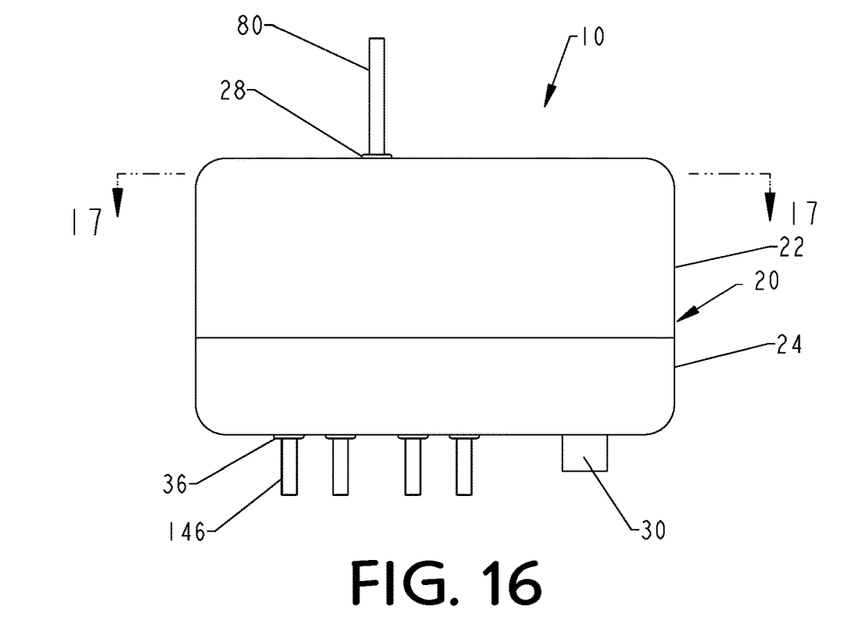
FIG. 16 is front view of the present invention.

As seen in FIGS. 16 and 17, housing assembly 20 comprises controller 250 and power supply 260, whereby controller 250 and power supply 260 are housed together inside housing assembly 20. Controller 250 is connected to rotational magnet valve assembly 40, and power supply 260 is connected to controller 250.

Pressure sensor 140, as seen in FIG. 6, triggers controller 250, on rise or fall of pressure, to provide power from power supply 260 to step motor 174 to its next position allowing flow of magnetic cartridge valve assembly 200 by aligning, with close proximity, magnet 70 and cartridge magnet 214, as seen in FIG. 10.

Power supply 260 provides sufficient voltage and current capacity to operate controller 250. This power supply 260 may be an AC line, DC battery, solar, etc. In another embodiment, power supply 260 may be directly integrated into controller 250. Power supply 260 may vary by size of invention 10.

Figure 18:
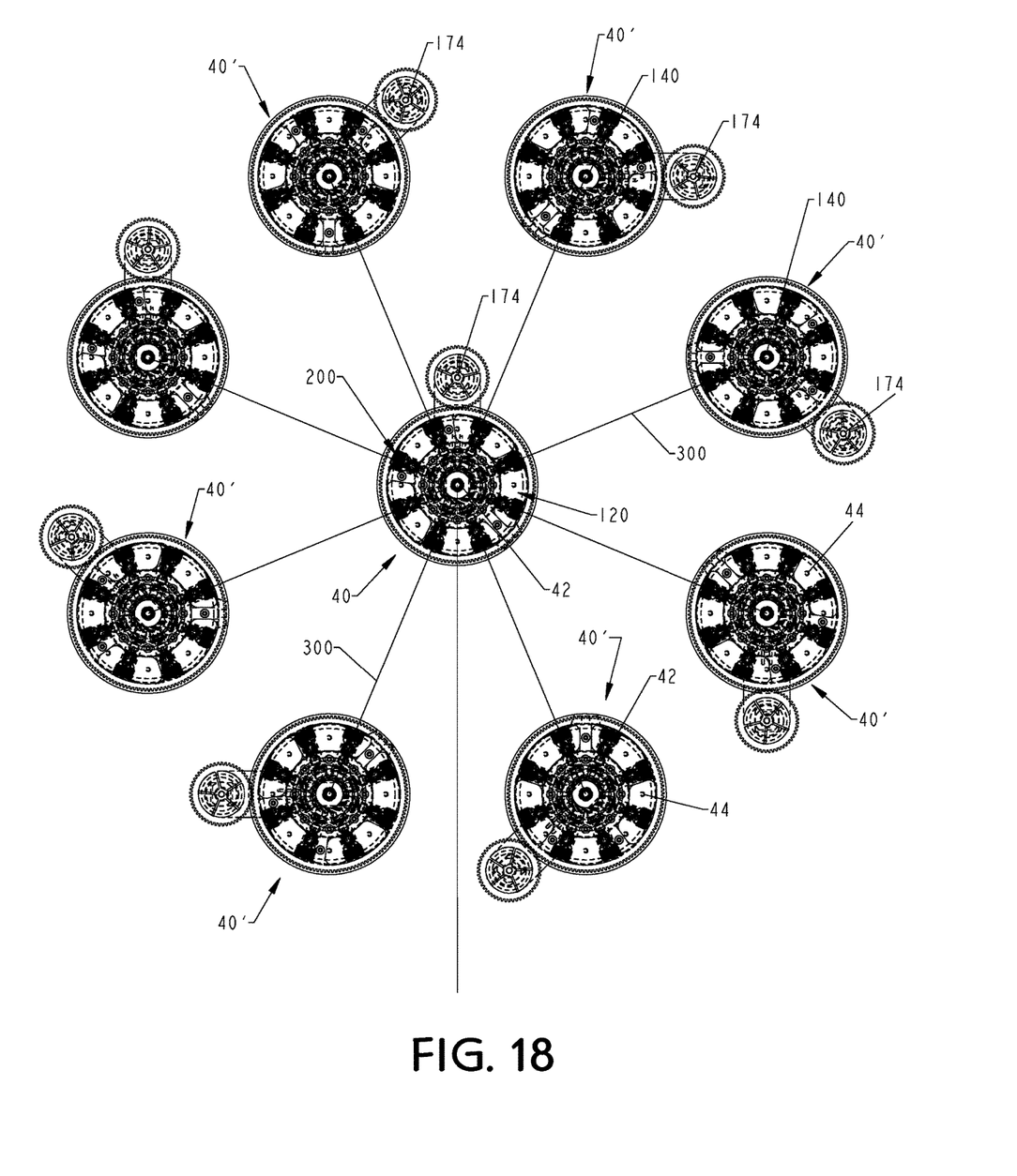
FIG. 18 is a view of multiple cut views taken along the lines 10-10, as seen in FIG. 4, of multiple rotational magnet valve assemblies connected.

As seen in FIG. 18, multiple rotational magnet valve assemblies 40 may be connected together.

In operation, upon actuation of power supply 260, as seen in FIG. 17, pressure sensor 140 senses rise or fall of pressure, and signals controller 250, seen in FIG. 17, to step motor 174 to a next magnetic cartridge valve assembly 200 sequentially by controller 250. For two or more rotational magnet valve assemblies 40 a first rotational magnet valve assembly 40 is used as a master rotational magnet valve assembly 40, and a second and subsequent rotational magnet valve assemblies 40 are designated as slave rotational magnet valve assembly 40'. One of outlets 44 on master rotational magnet valve assembly 40 is connected to inlet 42 of slave solenoid manifold assembly 40' by interconnecting tube 300 as shown in FIG. 18.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A rotational magnet indexing valve, comprising:
   A) a housing assembly; and
   B) a rotational magnet valve assembly comprising a driven gear assembly, a manifold assembly, a motor assembly, and a plurality of magnetic cartridge valve assemblies, said driven gear assembly comprising a driven gear, a yoke with a top base and a top base hole, a bearing, and an inlet cap with an inlet cap top protrusion and an inlet cap hole, and said yoke comprising a yoke magnet tab having a channel with a magnet hole and a magnet.

2. The rotational magnet indexing valve set forth in claim 1, further characterized in that said housing assembly comprises an upper housing, a lower housing, an inlet tube hole, a connector, and a plurality of outlet tube holes.

3. The rotational magnet indexing valve set forth in claim 1, further characterized in that said rotational magnet valve assembly comprises an inlet and a plurality of outlets.

4. The rotational magnet indexing valve set forth in claim 1, further characterized in that said driven gear mounts onto said yoke, said yoke receives said bearing and said inlet cap that are mounted together onto said manifold assembly.

5. The rotational magnet indexing valve set forth in claim 1, further characterized in that said top base hole receives said inlet cap top protrusion, and said inlet cap hole receives an inlet tube.

6. The rotational magnet indexing valve set forth in claim 1, further characterized in that said manifold assembly comprises a top face, a bottom face, a lateral side, a bridge, a manifold inlet hole, and a sensor hole.

7. The rotational magnet indexing valve set forth in claim 6, further characterized in that said lateral side comprises a plurality of cartridge bores, each of said cartridge bores extends until connecting to a respective manifold interior hole.

8. The rotational magnet indexing valve set forth in claim 7, further characterized in that said plurality of magnetic cartridge valve assemblies is radially positioned on said manifold assembly, whereby each of said cartridge bores receives a respective of said magnetic cartridge valve assembly.

9. The rotational magnet indexing valve set forth in claim 6, further characterized in that said motor assembly comprises a motor housing having a housing top face, a housing bottom face, a motor shaft thru hole, a drive gear, and a motor.

10. The rotational magnet indexing valve set forth in claim 9, further characterized in that said motor housing is separated a first predetermined distance from said lateral side and said yoke extends a second predetermined distance from said lateral side, wherein said first predetermined distance is greater than said second predetermined distance.

11. The rotational magnet indexing valve set forth in claim 9, further characterized in that said motor provides substantial power to said drive gear to move said driven gear, whereby said magnet orbits around said lateral side.

12. The rotational magnet indexing valve set forth in claim 6, further characterized in that said motor assembly connects to said bridge of said manifold assembly, in a way that said motor assembly is joined to said manifold assembly by said bridge, whereby said motor assembly is substantially parallel to a central axis of rotation of said rotational magnet valve assembly.

13. The rotational magnet indexing valve set forth in claim 1, further characterized in that said manifold assembly further comprises a pressure sensor, tube fitting connectors, and a plurality of outlet tubes.

14. The rotational magnet indexing valve set forth in claim 1, further characterized in that each of said magnetic cartridge valve assembly comprises a cartridge body, a cartridge head, a circumferential fluid recess, fluid passage holes, and a cartridge cavity.

15. The rotational magnet indexing valve set forth in claim 14, further characterized in that said cartridge cavity receives a cartridge magnet, a piston push rod, a piston, a return spring, and a retaining washer.

16. The rotational magnet indexing valve set forth in claim 15, further characterized in that when said magnet approaches each said cartridge magnet, a magnetic force causes each said return spring and said piston to move thus opening a fluid flow passage.

17. The rotational magnet indexing valve set forth in claim 1, further characterized in that said housing assembly houses said rotational magnet valve assembly, a controller, and a power supply.

18. The rotational magnet indexing valve set forth in claim 1, further characterized in that said manifold assembly is cylindrical in shape.

\* \* \* \* \*